Jan. 26, 1943. W. H. EDWARDS 2,309,445
VEHICLE SEAT CONSTRUCTION
Filed Sept. 7, 1939 2 Sheets-Sheet 1
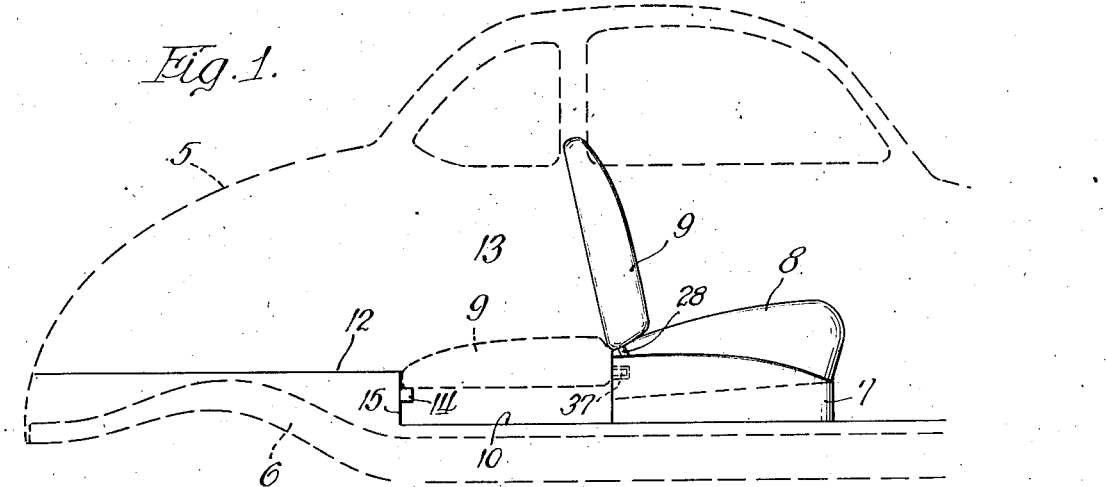
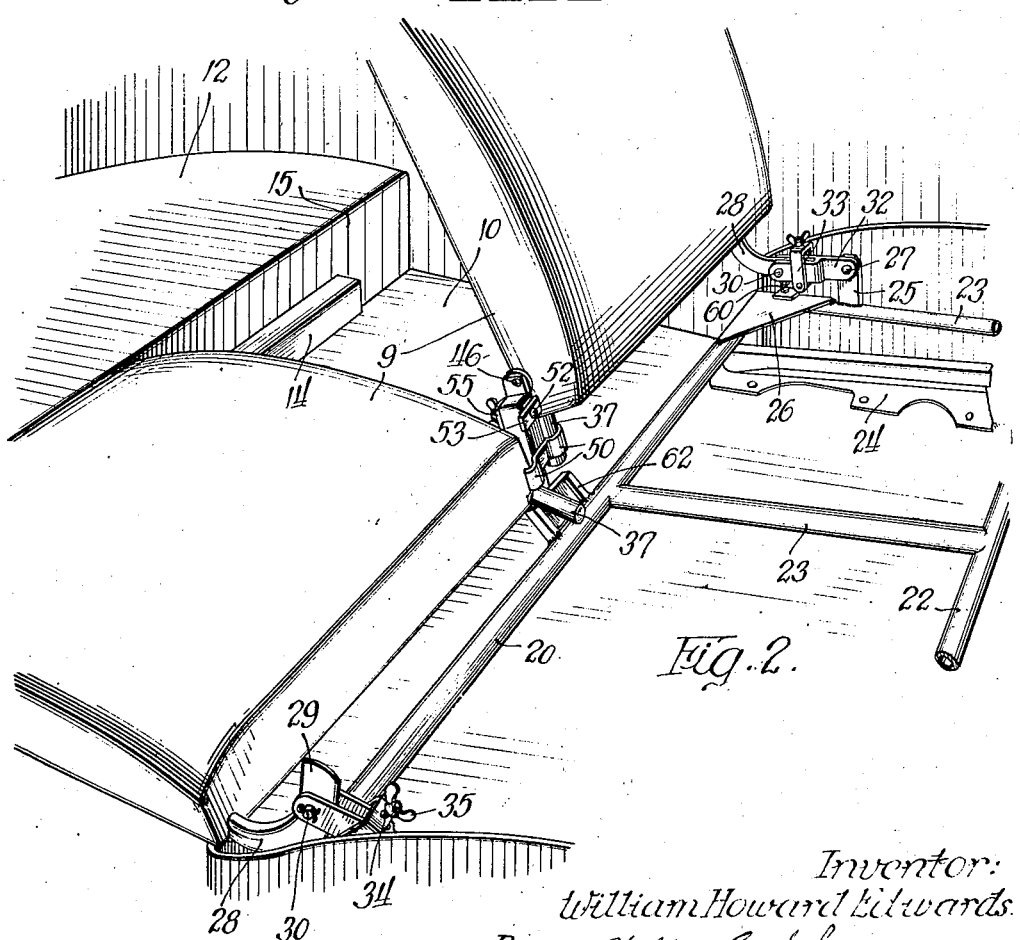
Inventor:
William Howard Edwards.
By Walter E. Schirmer
Atty.

Jan. 26, 1943.  W. H. EDWARDS  2,309,445
VEHICLE SEAT CONSTRUCTION
Filed Sept. 7, 1939   2 Sheets-Sheet 2
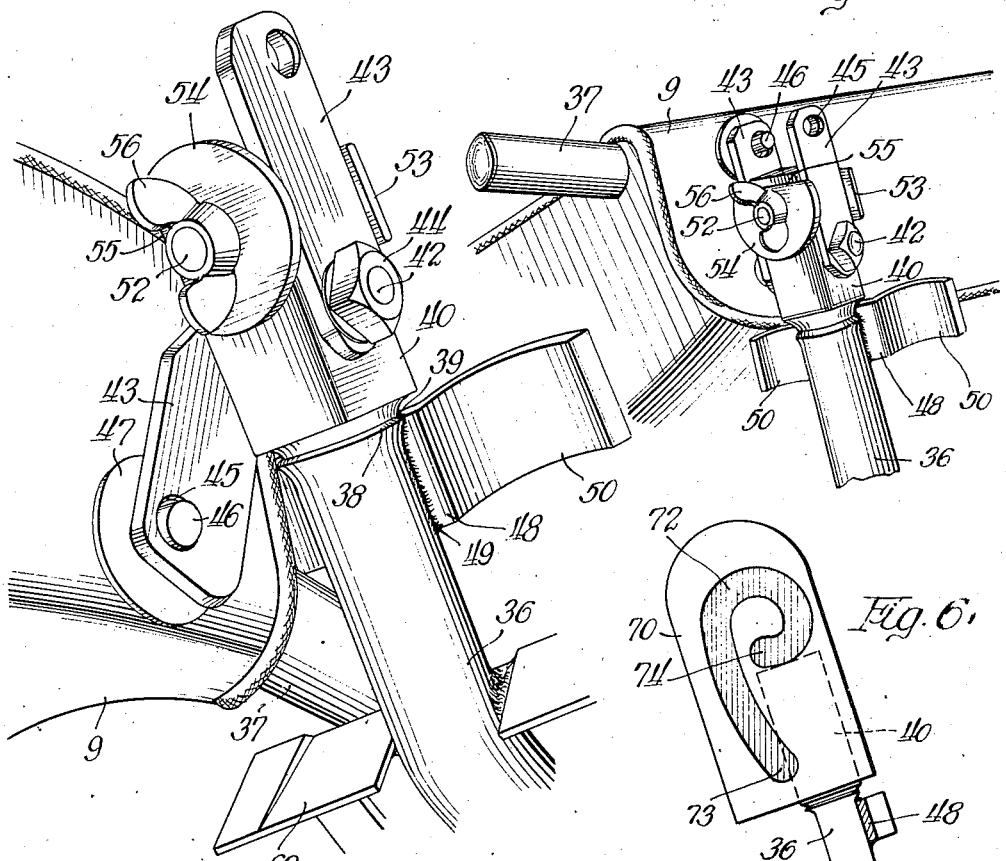
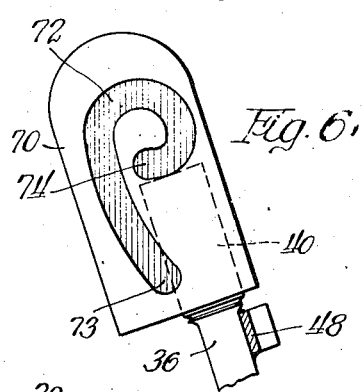
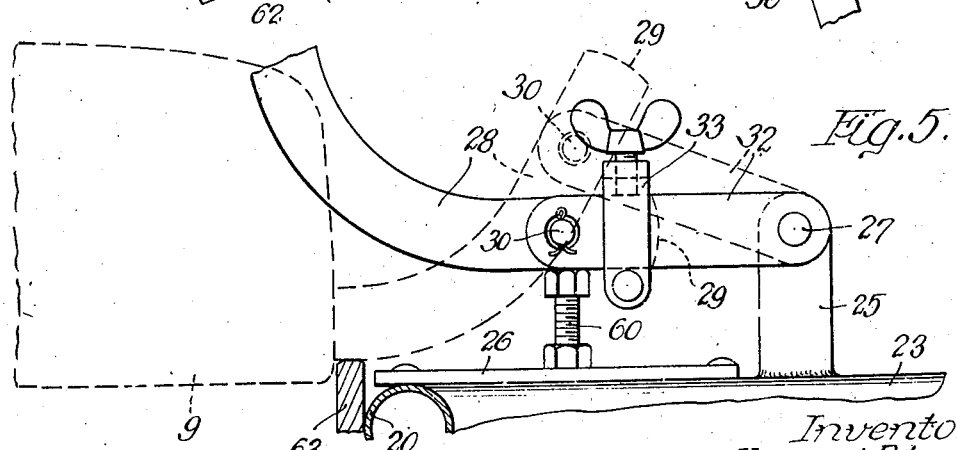
Inventor:
William Howard Edwards
By Walter E. Schirmer
Atty.

Patented Jan. 26, 1943

2,309,445

UNITED STATES PATENT OFFICE 2,309,445

VEHICLE SEAT CONSTRUCTION

William H. Edwards, South Bend, Ind., assignor to Edwards Iron Works, Inc., South Bend, Ind., a corporation of Indiana Application September 7, 1939, Serial No. 293,687

3 Claims. (Cl. 155—7)

The present invention relates to vehicle constructions, and in general is concerned with the provision of a vehicle in which the seat backs can be lowered to provide a bed within the car useful for camping purposes, or which may be employed for use as an emergency ambulance or the like.

Broadly considered, the present construction is directed to the conversion of a coupe type automobile in which either one or both of the seat backs can be lowered rearwardly from the normal driving position so as to lie substantially in a horizontal plane and form a continuation from the seat rearwardly over the space behind the seat to the rear deck of the vehicle.

One of the main features of the present invention is its adaptability to vehicles in which the seat backs are divided so that they may be individually controlled to tilt forwardly for access to the rear of the vehicle, or to be released from their normal supporting position to a horizontal position to provide a bed like structure.

In many types of coupes now on the market, the seat backs are divided so that either half may be tilted forwardly, and in some cases, the hinge construction for this tilting action is so arranged that as the seat back tilts forwardly, it also swings inwardly toward the center of the car so as to provide easy access to the portion of the vehicle rearwardly of the seat back. It is of course to be understood that the invention is easily applicable to closed car constructions of the coach or sedan type, wherein the backs of the front seats may be arranged to be lowered into a position to form a bed-like structure comprising the rear seat cushion, the front seat back and the front seat cushion.

One of the primary advantages of the present invention is its easy application to vehicles now in use and the relative simplicity of its operation and construction whereby the conventional type of seat back can be quickly adapted for sleeping purposes.

Still another advantage of the present construction is the provision of means which can be operated without any special tools or the like and which can be quickly actuated to convert the vehicle into a sleeping car even when in the hands of unskilled operators.

A further advantage resides in the provision of means which selectively may retain one of the seats in its normal position free for forward tilting movement, while allowing the other seat back to be adapted for producing a bed-like structure which can accommodate a person for sleeping or can be used for emergency purposes to support a stretcher or the like, as in the case of police cars where ambulance service may be required.

Another advantage secured by the present invention is that it may be employed in connection with the conventional type of seat mounting without in any way interfering with the normal action of the seat backs for driving purposes so that the desired characteristics of the seat construction conventionally employed can be retained with the added features of allowing the seat backs to be pivoted rearwardly. The present construction can be adapted to these types of vehicles without any material change in the seat frame or the seat posts and pillars, and the additional parts necessary for the conversion can be quickly and easily installed at relatively small cost. This means that the objects obtained by the present invention can be produced at small cost and can be employed in practically any type of conventional seat structure.

Other objects and advantages of the present invention, such as the simplicity of the parts necessary for the conversion and their relatively low cost of manufacture and assembly, will be more apparent from the following detailed description which, taken in conjunction with the accompanying drawings will disclose to those skilled in the art the particular construction and operation of a preferred form of the invention.

In the drawings:

Figure 1 is a diagrammatic elevational view of a coupe body employing the present invention;

Figure 2 is a perspective view showing one of the seat backs in lowered position with the other seat back arranged for conventional operation;

Figure 3 is a rear perspective view of the hinging arrangement at the center posts between the two seat backs;

Figure 4 is a similar view showing how the present construction operates when conventional tilting movement of the seat back is desired;

Figure 5 is an elevational view of the mechanism used for the outer side posts of the seat backs whereby they can be optionally locked for conventional movement or released for conversion purposes; and Figure 6 is an elevational view of a modified form which simplifies the center post construction.

Referring now in detail to the drawings, a vehicle body is indicated generally at 5 in Figure 1, and is adapted to be mounted upon the side rails 6 of the vehicle chassis. Within the vehicle body there is provided the seat frame 7 upon which is mounted the seat cushion 8 and to which is secured the tilting seat back 9. Rearwardly of the seat base 7, the floorboard 10 of the vehicle is extended to provide a package or luggage compartment space which terminates in the rear deck portion 12 of the vehicle which is accessible through the trunk opening normally provided in the rear end of the body 5. Usually there is a partition that provides the deck space above the deck opening 12 from the space 13 provided rearwardly of the seat back 9, but for purposes of the present invention, this partition may be removed back of both the seat backs, or if desired, in back of one seat back only, it being contemplated that in the latter case, an additional service seat can be installed rearwardly of the left hand seat back 9 for an attendant in the event that the vehicle is used for ambulance purposes. In order to support the seat back 9 when it is in lowered position, a suitable rail 14 is mounted on the vertically extending panel 15 which separates the floorboard 10 from the deck 12. The upper end of the seat back 9 is adapted to engage and be supported upon the rail 14 to hold it in a substantially horizontal position whereby it forms a continuation of the surface of the seat cushion 8 rearwardly into the deck space 12.

Considering now the construction shown in Figures 2 to 5, inclusive, the seat frame 7 includes transversely extending bars 20 and 22 which are tied together by cross members 23 so that the frame may slide along the guideways 24 at opposite ends thereof for adjustment forwardly and rearwardly depending upon the driver's desire. Mounted upon the end cross members 23 are vertically extending posts or pillars 25 which are adjacent the corner reinforcing plates 26. The pillars 25 are provided with a pivot pin 27 adapted to receive the forwardly curved end of the seat riser or post 28. In modifying this construction for the present purposes, the forwardly extending portion of the post 28 is cut away, as indicated at 29, and rearwardly of the end thereof, the pivot pin 30 is passed through the post to pivotally secure thereto the clevis 32, this clevis being pivotally mounted upon the upper end of the post 25 by means of the pin 27. For conventional operation of the seat, the post 28 and clevis 32 are held together against relative movement by means of the clamp 33 comprising a clevis fitting about the bifurcated end of the clevis 32 and slidable longitudinally thereon into a position where it engages over the forward end 29 of the post 28 received within the arms of the clevis 32 forwardly of the pin 30. The clamp 33 is provided with a threaded post 34 terminating in a wing nut portion 35 which may be screwed down to engage the arm portion 29, thereby locking the clevis 32 and the arm 28 against relative pivotal movement about the pin 30. Thus, in this position, the seat back 9 can only pivot at its outer end about the pin 27 carried by the pillar 25. Intermediate the ends of the transverse frame member 20 there is provided a rearwardly and upwardly extending post portion 36, shown more in detail in Figures 3 and 4, which normally extends upwardly to provide a pivot for the inner arm portion 37 of the seat back 9. However, in the present construction this post is cut off, as indicated at 38, and a square ended stud is inserted thereinto and welded thereto about the edge 38, as indicated at 39. The square end 40 of this stud projects an appreciable distance above the edge 38 and has the pin 42 extending transversely therethrough to which is secured on opposite faces of the portion 40 a pair of link members 43, these members 43 being pivotally mounted about the pin 42 and held against displacement by means of the nut 44. At the upper end of the links 43 there is provided an offset angularly directed opening 45 which is adapted to receive the pin 46 projecting angularly from the arm portion 37 of the seat back 9 and having the wear plate 47 thereon.

It will be noted that the post 36 carries a bracket 48 welded thereto, as indicated at 49, this bracket having opposite arcuately formed wing portions 50 which normally form stops for the lower ends of the arms 37 to limit rearward swinging movement of the seat backs 9. Extending through the portion 40 of the stud in a direction normal to the axis of the pin 42 and positioned thereabove is the bolt 52 which, at its head end, carries a locking plate 53 preventing the links 43 from swinging forwardly about the pin 42 in a clockwise direction. Rearwardly of the links 43 the pin 52 is provided with a washer 54 which has a slabbed off edge 55 and which is retained on the bolt 52 by means of the wing nut 56. When this washer is in the position shown in Figure 4, the links 43 are held against pivotal movement in either direction relative to the pin 42, and consequently the seat backs pivot about the upper ends of the links 43 on the pins 46 and with the clamp 33 shown in position locking arms 28 and 32 against relative pivotal movement, the seat back 9 is adapted to be tilted in a forward direction only, pivoting about pins 46 and 27. It will be noted that the position of these pivots is so arranged that as the seat back 9 is tilted forwardly, it also tilts inwardly toward the center of the seat frame due to the forward location of the pin 27 relative to the pin 46. This is the conventional tilting action normally employed in such a construction. When the seat is tilted back to a more or less vertical position for driving, the joint between the arm 28 and clevis 32 is adapted to seat upon the supporting post 60 shown clearly in Figure 5, which is adjustable to provide the proper driving position for the seat back.

Now, assuming that it is desired to lay one of the seat backs 9 into a rearwardly extending horizontal position for sleeping or emergency purposes, the clamp nut 35 of the clamp 33 is loosened to allow movement of the clamp 33 forwardly of the clevis 32 so that the clevis and arm 28 are released for pivotal action and may move into the position shown in dotted lines in Figure 5, pivoting about the pin 30 with respect to each other and the clevis pivoting about the pin 27. At the same time that the clamp 33 is thus released, the wing nut 56 on the pin 52 is loosened and the washer 54 is turned so that the slabbed edge 55 thereof extends in a vertical position releasing the respective link 43 for movement in a counterclockwise direction about the pin 42. Under such conditions, the seat back 9 may then be lowered into the position shown in the left hand side of Figure 2 when the edge 55 of the washer 54 is turned into a position 180° from that shown in Figure 3. Under such circumstances the extending end 37 of the inner seat riser or arm moves bodily forwardly and downwardly underneath the corresponding wing portion 50 of the bracket plate 48 and above the reinforcing bracket 62 carried by the cross member 20. The upper edge of the seat thereby engages the rail 14 to hold the seat back in a substantially horizontal position, as shown in dotted lines in Figure 1 and in Figure 5. Preferably, a suitable stop bar 63 is provided rearwardly of the frame member 20 beneath the arm 28 to limit the downward movement of this arm so as to form a positive support for preventing the forward end of the lowered seat back from moving downwardly below the stop.

Inasmuch as the portions 37 of the adjacent seat riser posts move forwardly into a position such as shown in Figure 2, it is necessary that suitable apertures be formed in the back vertical wall of the seat cushion 8 to accommodate the forwardly extending ends of these arms 37. Such openings are shown at 37', and the position of the arms 37 with respect to the seat cushion 8 is indicated in dotted lines in Figure 1 and indicates how these posts project into the rear of the seat cushion 8. When one of the seat backs has been moved into lowered position, the washer 54 may be reversed 180° to provide for free movement in a counterclockwise direction of the opposite corresponding link 43 carried by the other seat back. When it is desired to raise the seats back to their conventional driving position the washer 54 is rotated to first allow one and then the other of the links 43 to move into the position shown in Figure 4, and when the seat back has been moved to such position, the washer 54 is turned in such manner as to clamp the links 43 against movement between the washer and the forward locking plate 53. In such position, the posts 37 must pivot in the openings 45. The clamps 33 are then moved back into clamping position to lock the arms 28 and clevises 32 in non-rotative position, and both seat backs are then in a position to tilt forwardly and inwardly about the pivots 27 and 46.

Obviously, with such a construction it is possible to allow either one or both of the seat backs to be mounted in either conventional pivoting position or in position to lie rearwardly in a substantial continuation of the seat cushion 8.

In Figure 6 I have shown a modified form of center post construction, eliminating the use of the links 43 and the washer 54. In this embodiment of the invention the square stud or plug 40 is welded into the upper end of the post 36 in the manner previously described. On the opposite faces of the member 40 there are welded plates 70 which are thereby securely fixed to the stud 40 and which extend generally in the same planes as the links 43 of Figures 3 and 4. In each of the plates 70 there is provided a slot, indicated generally at 72, which slot has a lower end portion 73 and an upper inturned end 74. When the seats are normally positioned for tilting movement from the position shown in Figure 1 forwardly to allow access to the rear part of the vehicle, the pins 46 of the seat risers 37 are engaged in the portion 74 of the slot whereby they pivot in these portions to accommodate this tilting movement of the seat back. However, when it is desired to lay the seat back into the reclined position on the support 14, the inner edge of the seat is moved so that the pin 46 moves through the slot 72 from engagement in the portion 74 and downwardly into the lower end 73 of the slot. When in this position, the pin 46 is in substantially the same relative position as shown in Figure 3 with the seat back post 37 moved forwardly into the opening formed in the rear of the seat cushion 8 and indicated in dotted lines in Figure 1.

This particular construction has the advantage of being easier to operate, and also facilitates the conversion of the normal hinge construction for the present purposes.

It is therefore believed apparent that I have provided a novel type of seat hinging arrangement which allows for movement of the seat back into a horizontal position to convert the interior of the car for sleeping or emergency ambulance purposes, but which can be readily adjusted to provide the normal tilting action of the seat backs when the vehicle is used in the conventional manner.

I am aware that various changes may be made in the details of the present construction without departing from the underlying principles thereof, and I therefore do not intend to be limited except as defined by the scope and spirit of the appended claims.

I claim:

1. In combination, a vehicle seat frame having a vertical post and a laterally spaced substantially vertical second post, a link pivotally mounted at one end on said second post for vertical swinging movement, means carried by the second post restraining said link in a position forming a vertical continuation of said second post, a seat back having lateral frame members, means on one frame member pivotally supporting the same on the free end of said link, means for pivotally connecting the other frame member to the first post including a clevis pivotally connected therebetween, and means normally locking said clevis and other frame member against relative pivotal movement.

2. The combination of claim 1 wherein said second post has stop means engaged by the first frame member limiting rearward tilting thereof only when said link restraining means is in operative position.

3. In combination, a vehicle seat frame having a pair of laterally spaced vertically extending posts, link means, pins pivotally connecting said link means at one end to said posts for swinging movement about said posts but restraining said link means against longitudinal movement relative thereto, a seat back having laterally spaced side frame members pivotally connected adjacent their lower ends with the free ends of said link means movable, clamping means locking said link means against relative pivotal movement at one end connection thereof, stop means restraining said seat back to forward tilting about said unlocked ends of said links from a vertical position, and means for releasing said clamping means to shift the same out of operative position to provide for rearward tilting of said seat back into a substantially horizontal position.

WILLIAM H. EDWARDS.